United States Patent [19]

Johns

[11] Patent Number: 4,768,409

[45] Date of Patent: Sep. 6, 1988

[54] METHOD AND APPARATUS FOR SERVERING THIN STRIP

[75] Inventor: Robert H. Johns, Natrona Heights, Pa.

[73] Assignee: Allegheny Ludlum Corporation, Pittsburgh, Pa.

[21] Appl. No.: 787,274

[22] Filed: Oct. 15, 1985

Related U.S. Application Data

[63] Continuation of Ser. No. 552,579, Nov. 16, 1983, abandoned.

[51] Int. Cl.[4] ........................ B23D 17/02; B23D 25/06

[52] U.S. Cl. ........................................... 83/42; 83/370; 83/578; 83/651.1

[58] Field of Search ................. 83/578, 42, 370, 651.1

[56] References Cited

U.S. PATENT DOCUMENTS 2,846,002 8/1958 Farmwald et al. .................. 83/578

3,114,282 12/1963 Reifenhauser et al. ............... 83/370

3,213,738 10/1965 Hough ............................ 83/578 X

FOREIGN PATENT DOCUMENTS 1223286 8/1966 Fed. Rep. of Germany ..... 83/651.1

*Primary Examiner*—Donald R. Schran
*Attorney, Agent, or Firm*—Patrick J. Viccaro

[57] ABSTRACT

A method and apparatus are provided for severing a moving thin strip material across the width of the strip by providing a thin rigid cutting element and urging the cutting element to move rapidly across the path of travel of the strip material in a plane transverse to the plane of the strip material. The strip material is contacted about one side edge and the cutting wire continues to rapidly move across the strip width from a first edge to a second edge to sever the moving strip. The method and apparatus are useful for severing strip material being produced at up to 4000 feet per minute and is not dependent upon the gauge or ductility of the material.

15 Claims, 1 Drawing Sheet

METHOD AND APPARATUS FOR SERVERING THIN STRIP

This is a continuation of application Ser. No. 552,579, filed Nov. 16, 1983, now abandoned.

BACKGROUND OF THE INVENTION

This invention relates to a method and apparatus for severing thin strip material. More particularly, the invention relates to a method and apparatus for rapidly severing thin metal strip using a cutting element which rapidly moves transverse to the strip direction, such as a flying wire strip cutter.

In production of thin strip material, it becomes necessary to sever the strip in order to facilitate catching and coiling of the strip. For high-speed production processes, such as casting thin metal strip directly from the molten alloy to solid strip, such as is shown in U.S. Pat. No. 3,856,513, such strip is produced at speeds of between 2000 to 4000 feet per minute (610 to 1219 meters per minute). At such speeds, conventional methods and apparatus for severing the strip are not suitable.

For example, a conventional flying shear method where upper and lower shear blades are moved along the product with synchronized velocity, is not suitable. The distances necessary to accelerate the blades to the high-speed velocity and to decelerate after cutting are too great to make this a practical expedient. On the other hand, rotating shears which bring together rapidly rotating upper and lower units eliminate such distance requirements, such rotating shears, however, require complex and expensive equipment. Such a device also requires a threading feature to catch and thread the first or leading end of a strip through the unit.

Any such system which requires catching and threading of the leading end of a high-speed strip material has been found in the industry to be not practical for any system having vertically-moving upper and lower cutting units. In an effort to avoid such problems, U.S. Pat. No. 4,116,394, issued Sept. 26, 1978, discloses a device which uses a scissors-like action to catch and cut a thin strip material on a winding coil. However, such device is useful only once in a given operation as the strip is wound on top of it to build up the coil.

Even free-standing scissors-type cutting units might be useful if the blade action is quick enough to not act as a barrier which would substantially interfere with the strip movement. It appears that a blade dwell time of greater than 50 milliseconds would be unacceptable and because of such requirements, such a device has not been found acceptable.

A potential nonmechanical method using linear-shaped explosive charges can make cuts in about 1 millisecond or less using shock waves generated by the explosive charge. However, such devices are expensive, require particular skills in explosives, and require controlled stand-off distances commensurate with the explosive force in order to make the cut. Furthermore, shock waves appear to deflect ends of a severed strip from the path of travel and make recapturing of the new leading edge difficult.

What is needed is a method and apparatus for severing high-speed strip products quickly and in a low-cost manner without disrupting the production process. The method also should be useful over a wide range of gauge and product conditions.

SUMMARY OF THE INVENTION

In accordance with the present invention, a method is provided for severing moving thin strip material across the strip width by providing a thin elongated cutting element, urging the cutting element to move rapidly across the path of travel of the strip material in a plane transverse to the plane of the strip material, contacting the strip material about one side edge with the rapidly-moving cutting element, and continuing to rapidly move the cutting element across the strip from first edge to second edge to sever the moving strip.

An apparatus for rapidly severing moving thin strip material is also provided.

DETAILED DESCRIPTION OF THE PREFERRED EMBODIMENTS

Figure 1:
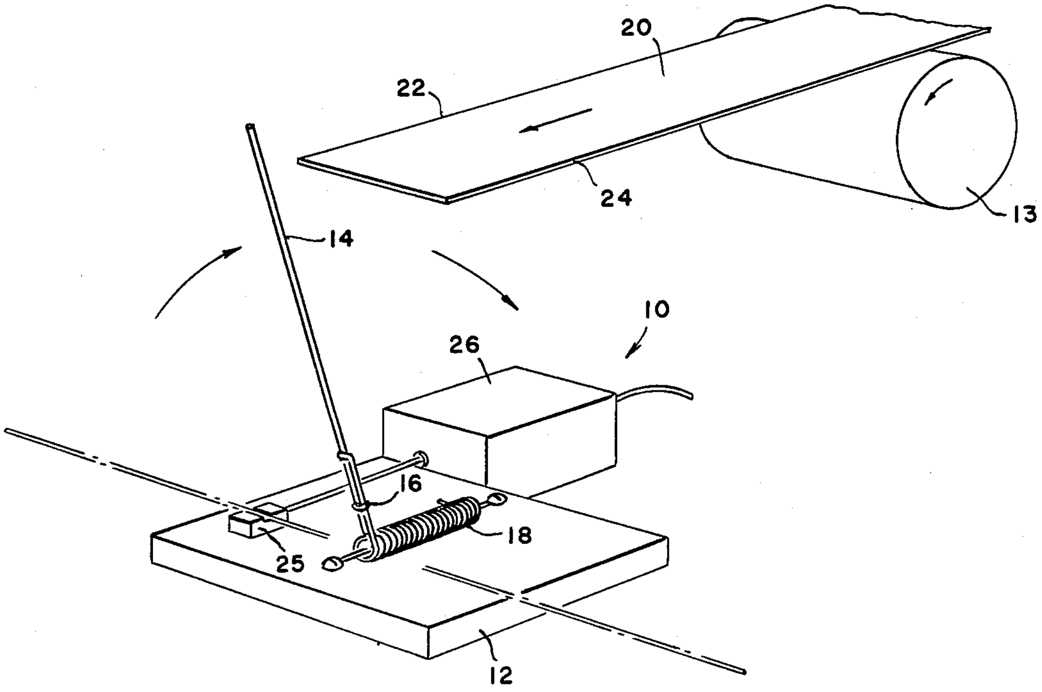
FIG. 1 is a schematic diagram of an embodiment of the apparatus of the present invention.

The method and apparatus of the present invention relies on the finding that the thin strip material can be easily severed by striking it at one edge with a rapidly-moving, rigid cutting element. Particularly, a flying wire-type cutter is described. Broadly described in the FIG. 1 is a device 10 for high-speed cutting of thin strip material 20 through the rapid movement of a cutting element 14 from edge 22 to edge 24 of the strip 20.

Strip 20 is a thin-gauge strip material which may be metal, plastic or other material. The present invention is particularly useful for direct-cast metal strip. By thin gauge as used herein, it is meant a thin strip material having a thickness of about 0.001 to 0.010 inch (0.0254 to 0.254 mm) or preferably less than 0.005 inch (0.127 mm). It has also been found that the width of the strip may vary from small widths, such as of wire having a one-to-one cross-sectional ratio, to strip having a width up to 6 inches wide. It has also been found that the present invention is useful for various gauges and ductility of material and is equally applicable to cut the thinnest, most ductile metal strip to thicker and more fragile materials. The invention is particularly useful for cutting strip material produced in high-speed processes and for cutting such material when free flying in an unsupported condition in the vicinity of the severance.

Apparatus 10 includes a cutting element 14 which is rapidly movable so as to intercept the path of travel of strip 20 moved by conventional means, such as roll 13. Element 14 should be an elongated material of thin cross section. Element 14 may be flexible, but preferably it is rigid enough to be self supporting if held by one end. Any of various shapes of elememt 14 may suffice for the present invention, but preferably it has been found that a rigid wire is quite suitable. The wire may be made of metal, and suitable metals are common iron, spring steel and music wire.

The means for urging element 14 can be provided for in numerous manners which are not necessarily critical to the present invention. A suitable means of rapidly moving the element 14 across the path of travel of the strip material is required, however. As shown in the Figures, element 14 is urged to move by a biasing means. Specifically, in FIG. 1 the biasing means may be a spring device 18. In the embodiment shown, element 14 is also attached by one end by fastener 16 to spring 18 attached on base unit 12. In such embodiment, spring device 18 can be compressed or loaded, such as by holding device 25, such that element 14 can be released by a suitable release mechanism 26.

Figure 2:
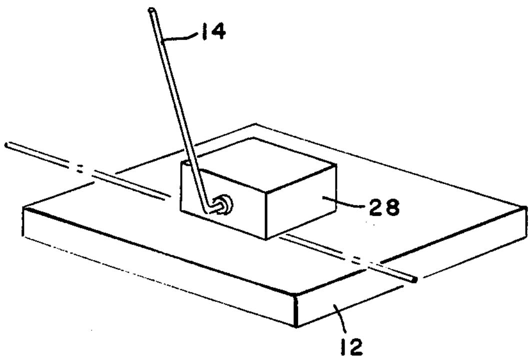
FIG. 2 is a schematic of a partial embodiment of the apparatus of the present invention.

In another embodiment in FIG. 2, urging means may permit reloading of element 14 alternately in order that element 14 can operate to sever the strip material from either side edge. By such an embodiment, the device does not need to be loaded only on one side and can facilitate cutting the strip from either edge 22 or 24.

As shown in the FIG. 1, a preferred embodiment moves element 14 through an arcuate path about the fixed end attached to base 12 and spring device 18. Preferably, element 14 is movable through a 180° arcuate path. Such a means 28 for urging element 14 may be a rotary solenoid, preferably one with a self-loading mechanism, or an air-type actuator.

The speeds of element 14 may vary, depending on the biasing means. It has been found that when using a flying wire cutter embodiment, the speeds of the wire may range from about 3000 to 8000 feet per minute (914 to 2438 meters per minute).

In the operation of the present invention, apparatus 10 is positioned adjacent the path of travel of strip 20. The exact position depends on the travel path of the cutting element 14 in order that element 14 may contact one of the edges of the strip material 20 to facilitate severance. What is important is that element 14 rapidly moves to intercept the strip material travel path such that element 14 moves rapidly across the path of travel of the strip. Preferably, the movement is in a plane transverse to the plane in which the strip material lies. As shown in the FIG. 1, the plane of the strip material may be a substantially horizontal plane. Furthermore, as shown in the FIG. 1, the plane of the path of travel of element 14 is transverse and is substantially a vertical plane. Apparatus 10, as shown in the Figure, is located substantially directly below the strip travel path.

Apparatus 10 is cocked, as shown in the FIG. 1, by compressing the spring element 18 to load the apparatus 10 with the cutting element 14 in a starting position by holding device 25. As strip 20 is produced and it may be free flying and unsupported in the vicinity of the proposed severance, the apparatus 10 can be activated by a tripper relay or release mechanism 26 through holding device 25 in order to sever the strip. Spring device 18 rapidly moves the cutting element 14 in a whip-like action which sweeps across a 180° arc. The cutting element 14 contacts the strip material about edge 22 in order to begin severance of the strip. It is important that element 14 first contact the strip at or about the edge, though the particular angular position of cutting element 14 in relation to edge 22 as it makes contact is not critical. Preferably, element 14 is inclined from the horizontal at least 45° when it contacts the edge of strip 20.

The force of the rapidly-moving element 14 continues across the strip width from edge 22 to edge 24 to sever the moving strip. The plane of movement of cutting element 14 should be transverse to the strip direction. The plane may or may not be perpendicular to the edges of the strip 20. Furthermore, it may be desirable to have the plane of movement of cutting element 14 arranged such that the element 14 has a velocity vector in the direction of the strip movement to further facilitate cutting and severing of rapidly-moving strip material. In other words, the plane of the arc of element 14 may be angled slightly in the direction of strip movement. The most important feature for cutting, however, is the transverse movement of the cutting element 14 and its first contacting the edge of the strip 20.

In order to further understand the present invention, the following example is presented. Using the method described above and generally as shown in the Figure, a thin strip metal material having a thickness of about 0.002 inch (0.0508 mm) was being produced at about 3000 feet per minute (914 meters per minute). Apparatus 10, having a cutting wire 14 made of common iron, was spring loaded. The spring was capable of driving the cutting wire at a velocity of at least 4000 fpm, at contact with the strip. Using such an apparatus, it was found that wire traveled the 180° arcuate path in approximately 35 milliseconds. Furthermore, the strip being cut was 4.8 inches (121.9 mm) wide and was severed in less than 4 milliseconds. The strip was severed without substantially interrupting the casting process.

As was the object of the present invention, the method and apparatus is provided for severing high-speed strip product without disrupting the production process quickly and in a low-cost manner. The present invention also has the advantage of being able to cut thin strip materials at low speeds on the order of less than 500 feet per minute (152 meters per minute). Such severances can be done on a free-flying unsupported strip with minimum side deflections so as not to affect the path of travel of the leading edge of the strip material. Furthermore, the present invention has the advantage in that it is useful over a variety of materials and appears independent of ductility within the gauge limits disclosed herein.

Although preferred and alternative embodiments have been described, it will be apparent to one skilled in the art that changes can be made herein without departing from the scope of the invention, for example, higher velocities for cutting element 14 will enable one to cut thicker and less ductile material.

What is claimed is:

1. A method of severing a moving thin strip material across the strip width, the method comprising:
- moving a thin strip material having a thickness up to 0.010 inch;
- providing a thin elongated cutting wire element;
- urging the cutting element to move rapidly across the path of travel of the strip material in a plane transverse to the plane of the strip material;
- contacting the strip material about the one side edge with the rapidly-moving cutting element; and
- continuing to rapidly move the cutting element across the strip width from first edge to second edge to sever the moving strip, the strip being free flying and unsupported in the vicinity of the severance.

2. The method as set forth in claim 1 including moving the cutting element through an arcuate path of travel.

3. The method as set forth in claim 2 including moving the cutting element through an arc of 180°.

4. The method as set forth in claim 1 wherein the strip material at a speed of up to about 4000 feet per minute.

5. The method as set forth in claim 1 wherein the strip material may be up to 6 inches wide.

6. The method as set forth in claim 1 wherein the strip material is less than 0.005 inch thick.

7. The method as set forth in claim 1 including urging the cutting element to move alternately transverse with respect to the strip from second edge to first edge to sever the strip.

8. The method as set forth in claim 1 including moving the cutting element at speeds of greater than 3000 feet per minute.

9. An apparatus for rapidly severing moving thin strip material, the apparatus comprising:

means for moving a thin strip material being free flying and unsupported in the vicinity of the severance;

a thin elongated cutting wire element; and means for urging the cutting element to move rapidly across the path of travel of the strip material in a plane transverse to the plane of the strip material, and to contact a first edge of the strip material and to continue to rapidly move across the strip material from the first edge to a second edge to sever the moving strip.

10. The apparatus as set forth in claim 9 wherein the urging means is a biasing means.

11. The apparatus as set forth in claim 10 wherein the biasing means is a spring device.

12. The apparatus as set forth in claim 9 including means for securing the cutting element at one end to the urging means so as to move the element through an arcuate path.

13. The apparatus as set forth in claim 9 wherein the cutting element is flexible.

14. The apparatus as set forth in claim 9 wherein the cutting element is rigid.

15. The apparatus as set forth in claim 9 including a means to move the element transverse to the strip path of travel to sever the strip from the second edge to the first edge alternately.

* * * * *

UNITED STATES PATENT OFFICE
CERTIFICATE OF CORRECTION

Patent No. 4,768,409 Dated September 6, 1988

Inventor(s) Robert H. Johns

It is certified that error appears in the above-identified patent and that said Letters Patent are hereby corrected as shown below:

Please correct Item [54], the title as follows:

Delete "SERVERING" and insert -- SEVERING --.

In claim 4, line 1, delete "wherein" and insert -- including moving --.

Signed and Sealed this

Twenty-fourth Day of January, 1989

*Attest:*

DONALD J. QUIGG

*Attesting Officer*

*Commissioner of Patents and Trademarks*